United States Patent [19]

Matsuda et al.

[11] Patent Number: 5,169,137
[45] Date of Patent: Dec. 8, 1992

[54] MAGAZINE FOR PHOTOSENSITIVE SHEETS

[75] Inventors: Naoyuki Matsuda; Sadanobu Murasaki, both of Machida; Hajime Takei; Yukiyoshi Yamakoshi, both of Isehara, all of Japan

[73] Assignee: Minolta Camera Kabushiki Kaisha, Osaka, Japan

[21] Appl. No.: 634,710

[22] Filed: Dec. 27, 1990

[30] Foreign Application Priority Data

Dec. 28, 1989 [JP] Japan .................................. 1-341291

[51] Int. Cl.$^5$ .............................................. B65H 1/00
[52] U.S. Cl. .................................... 271/145; 271/162; 206/455
[58] Field of Search ...................... 271/145, 162–164; 221/197, 287, 302; 206/455; 354/276, 277, 282, 283; 378/182, 184

[56] References Cited

U.S. PATENT DOCUMENTS 4,727,391 2/1988 Tajima et al. ................. 206/455 X
4,783,019 11/1988 Schmidt et al. ............... 206/455 X
4,799,591 1/1989 Tajima et al. ................. 206/455 X

FOREIGN PATENT DOCUMENTS 57-38669 8/1982 Japan .
63-11936 1/1988 Japan .
1556816 9/1976 United Kingdom .

Primary Examiner—David H. Bollinger
Attorney, Agent, or Firm—Price, Gess & Ubell

[57] ABSTRACT

Disclosed is a magazine for photosensitive sheets, comprising a box-type casing in which photosensitive sheets are stored, the casing having an opening, and a cover member removably stuck on the casing to cover the opening. When the magazine is used, the cover member is removed from the casing to uncover the opening. The end portion of the cover member with which the cover member starts to be removed from the casing has less elasticity than the other part of the cover member.

15 Claims, 14 Drawing Sheets

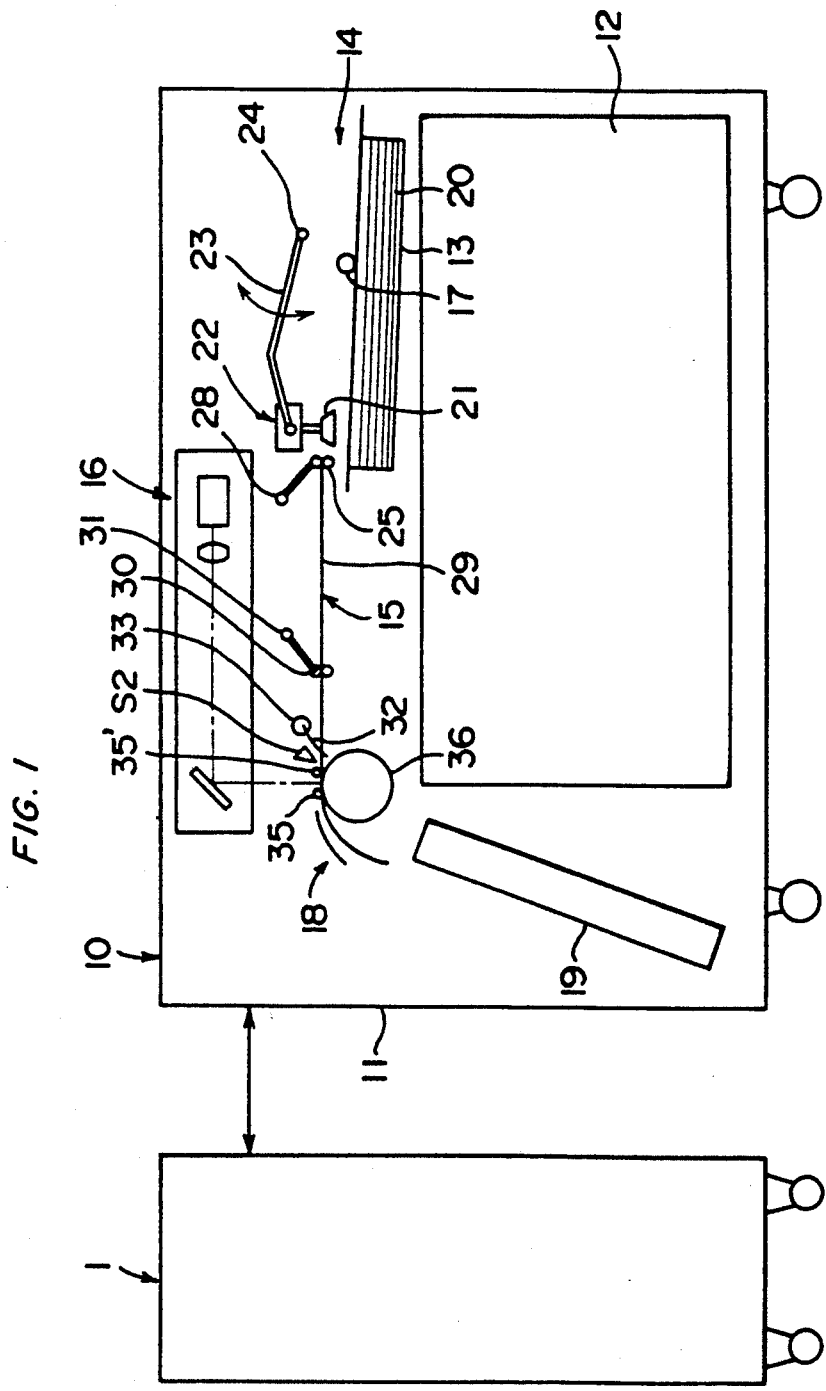

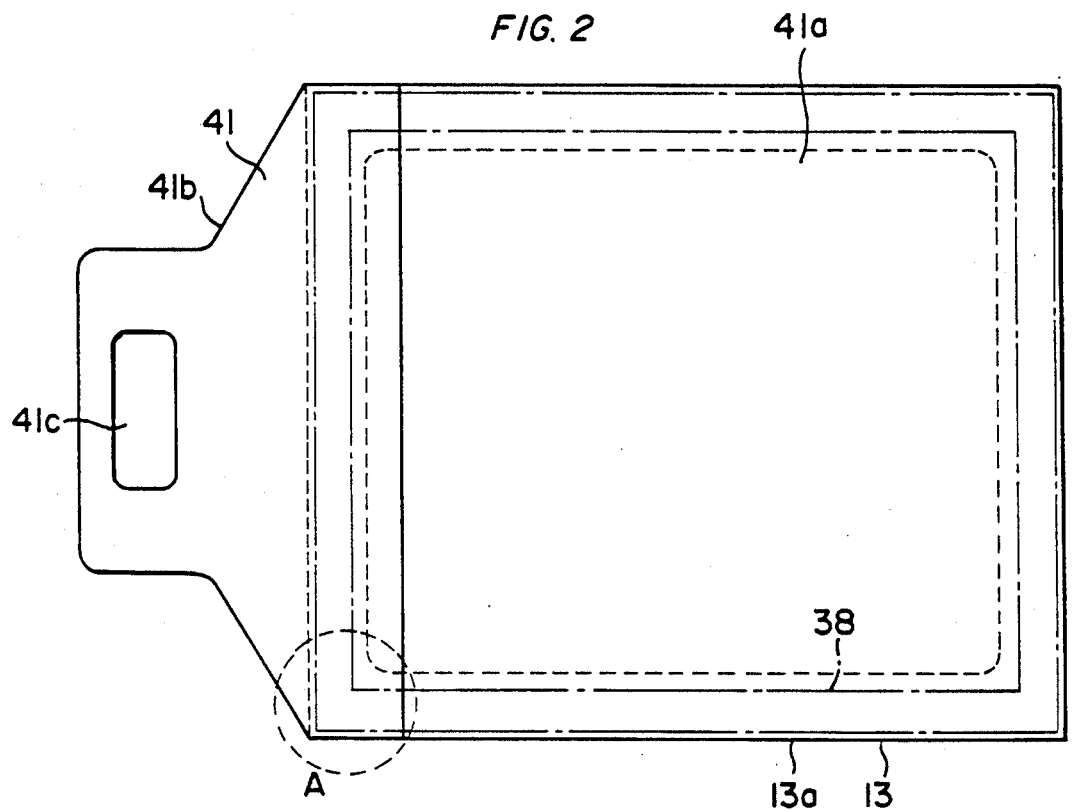
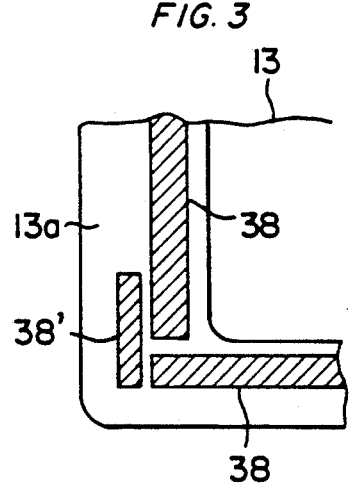

MAGAZINE FOR PHOTOSENSITIVE SHEETS

BACKGROUND OF THE INVENTION

1. Field of the Invention

The present invention relates to a magazine for photosensitive sheets, and more particularly to a magazine to be detachably loaded in an image forming apparatus in which photosensitive sheets to be fed to an image forming section one after another are stacked in the magazine.

2. Description of Related Art

In the art of a laser printer for forming an image on a photosensitive film with a laser beam, conventionally, a detachable magazine in which photosensitive films are stacked is employed. Regarding a disposable type among such magazines, a sheet-type light screening cover is stuck on the magazine to cover an opening of the magazine. When the magazine is loaded in a printer, the cover is removed from the magazine and wound so that the interior of the magazine is partly revealed, and when the magazine is to be unloaded from the printer, the cover is unwound and stuck on the magazine again. The cover is to shield the interior of the magazine from light when the magazine is out of the printer, and the cover is made of an elastic material like polyethylene so that there will never occur a gap between the magazine and the cover even when the magazine bends.

Great force is applied to the end portion of the cover when the cover starts to be removed from the magazine, and if the cover is wholly made of an elastic material, the end portion stretches because of the force. Then, when the cover is unwound, the end portion still stretches or forms wrinkles, and the cover does not adhere to the magazine well, which impairs the function of the cover of shielding the interior of the magazine from light.

SUMMARY OF THE INVENTION

It is therefore an object of the present invention to provide a magazine for photosensitive sheets, the interior of which magazine is shielded from light completely even when a cover is unwound and stuck on the magazine again.

In order to attain the object, a magazine for photosensitive sheets according to the present invention has a sheet-type cover member for covering an opening of a casing, the cover member having an end portion which has less elasticity than the other part of the cover member.

Materials to be used as the end portion of the cover member are, for example, polyester whose elastic coefficient is about 400 kg/cm$^2$, polycarbonate, cellulose acetate, polystyrene, etc. Materials to be used as the other part of the cover member are, for example, polyethylene, soft polyvinyl chloride, polyvinylidene chloride, nylon, etc.

When the magazine is used, the cover member starts to be removed from the casing with the end portion, and great force is applied to the end portion of the cover member. However, since the end portion has less elasticity than the other part of the cover member, the end portion does not stretch, and when the cover member is stuck on the magazine again, the interior of the magazine is shielded from light completely by the cover member.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 1 through 16 show a first embodiment of the present invention;

FIG. 1 is a schematic view of a printer provided with a magazine;

FIG. 2 is a plan view of the magazine;

FIG. 3 is a plan view of the corner A of the magazine shown in FIG. 2, showing the arrangement of an adhesive tape;

FIG. 4 is a front view of the magazine and a cover for the magazine, showing the overlap portion of the cover;

FIG. 5 is a cross sectional view of the magazine and a magazine frame, the view showing the mounting of the magazine on the frame;

FIG. 6 is a perspective view of a cover winding section;

FIG. 7 is a perspective view of a transmission system for the cover winding section;

FIG. 8 is a front view of the transmission system for the cover winding section;

FIG. 9 is a perspective view of the cover winding section, the view showing a structure for the engagement of the end portion of the cover with a winding roller;

FIGS. 10 and 11 are sectional views of the winding roller;

FIG. 12 is a cross sectional view of the cover winding section, the view showing the beginning of a cover winding operation;

FIGS. 13 and 14 are cross sectional views of a disadvantageous cover winding section;

FIG. 15 is a flowchart showing a procedure of winding the cover;

FIG. 16 is a flowchart showing a procedure of unwinding the cover;

DETAILED DESCRIPTION OF THE PREFERRED EMBODIMENTS

Figure 4:
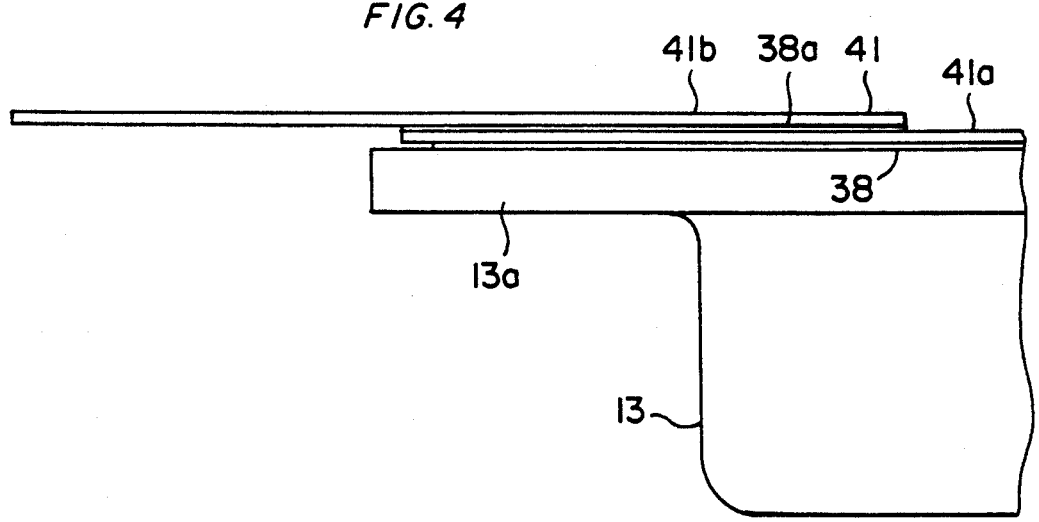
Figure 5:
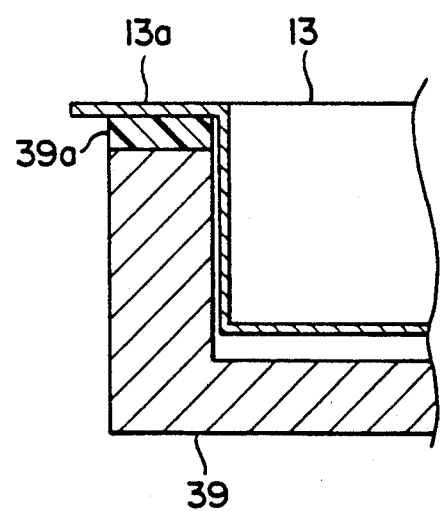

Exemplary magazines for photosensitive sheets embodying the principles and features of the present invention are hereinafter described in reference to the accompanying drawings.

FIG. 1 shows the general structure of a printer provided with a magazine according to the present invention. The printer 10 has a box-type housing 11, and in the housing 11 are provided a power supply box 12, a film magazine 13, a film feeder 14, a film transport unit 15, an optical unit 16, a sub-scan unit 18 and a receive magazine 19. The interior of the housing 11 is shielded from light.

The magazine 13, in which unexposed films 20 are stacked, is disposed above the power supply box 12, and a light screening cover 41 (see FIGS. 2 and 6) which will be described in detail later is provided so as to cover and uncover the films 20 automatically.

Above the magazine 13 is disposed the vacuum type film feeder 14 for feeding the films 20 out of the magazine 13 one by one. In the film feeder 14, a sucker holding unit 22 holding vacuum suckers 21 is fixed on arms 23 at the end. The arms 23 are capable of pivoting on shafts 24 in the directions shown by the arrow in a manner to enable the vacuum suckers 21 to be kept in the horizontal posture, so that the vacuum suckers 21 suck the topmost film of the film stack 20 to feed it between transport rollers 25 disposed at the entrance of the film transport unit 15.

The transport rollers 25 of the film transport unit 15 are composed of a lower roller which is a driving roller and an upper roller which is a driven roller, and the upper roller is capable of pivoting on a shaft 28 so that the rollers 25 come into contact with each other and separate from each other. While the rollers 25 are separate from each other, the leading edge of a film picked up by the film feeder 14 is inserted between the rollers 25, successively the upper roller comes into contact with the lower roller to pinch the film, and then the film is transported onto a guide plate 29. In the center of the transport unit 15 are disposed diskew rollers 30 which are composed of an upper roller and a lower roller. The upper roller, which is a driving roller, is capable of pivoting on a shaft 31. The diskew rollers 30 are provided in order to correct the skew of the film transported by the rollers 25. The leading edge of the film contacts with a stopper 32, which is capable of pivoting on a shaft 33, and comes to a stop regulated by the stopper 32.

Next, the film is released from the regulation by the stopper 32 and comes into the sub-scan unit 18 comprising upper rollers 35 and 35' which are freely rotatable and coated with elastic material, and a sub-scan drum 36 which is a driven drum. While the film is moving in the sub-scan unit 18, it is exposed to a laser beam which is radiated from the optical unit 16 in the direction along the axis of the sub-scan drum 36. The thus exposed film is received by the magazine 19. The receive magazine 19 in which exposed films are stored is discharged from the printer 10 shielding the films from light, and thereafter the films are developed. Further, instead of the receive magazine 19, a developing device may be installed inside the printer 10 so that each film is developed inside the printer 10 as soon as it has ben exposed. In this case, the developed films are ejected from the printer 10 one after another.

Incidentally, a host machine 1 is placed next to the printer 10, and image data are transmitted from the host machine 1 to the printer 10 for one image at a time.

Referring to FIGS. 2 through 14, the structures of the magazine 13 and a film winding section are hereinafter described.

FIGS. 2, 3 and 4 show the magazine 13. The box-type magazine 13 is made of plastic, and it is opaque in order to shield the film stack 20 from light. The magazine 13 has a flange 13a on the upper part. The flange 13a has an adhesive tape 38 thereon. The light screening cover 41 having flexibility is disposed on the magazine 13, and the cover 41 repeats adhering to the flange 13a with the adhesive tape 38 and separating therefrom. A bar code is proved on the bottom of the magazine 13, which bar code represents the size of the films 20 stacked in the magazine 13.

Figure 6:
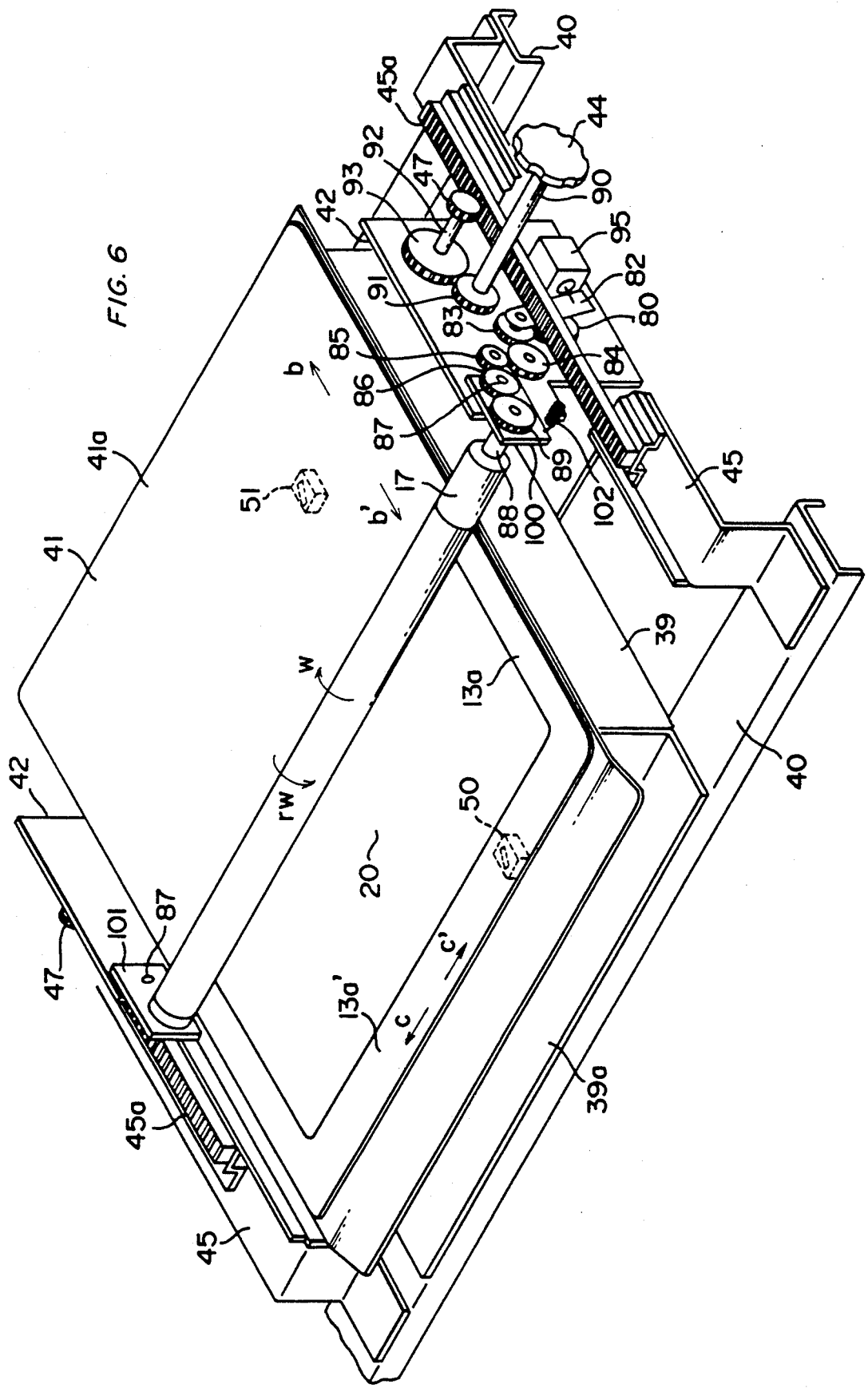

The cover 41 comprises a main part 41a which corresponds to the size of the magazine 13, and an end portion 41b which is engaged with a winding roller 17 in order to enable cover winding and unwinding (see FIG. 6). In order to assure the adhesion of the main part 41a to the flange 13a, the main part 41a is made of an elastic material, for example, a polyethylene sheet whose tensile elastic coefficient is 40 kg/cm$^2$ and whose thickness is 75–100 $\mu$m. Since great force to remove the cover 41 from the flange 13a is applied to the end portion 41b when starting cover winding, the end portion 41b is made of a less elastic material than the material of the main part 41a, for example, a polyester sheet whose tensile elastic coefficient is 400 kg/cm$^2$ and whose thickness if 75–100 $\mu$m. As shown in FIG. 4, the main part 41a and the end portion 41b overlap at the front end of the magazine 13 and are stuck together with an adhesive tape 38a.

The cover 41 can be made of other materials as well as polyethylene and polyester. The main part 41a can be made of an elastic material such as soft polyvinyl chloride, polyvinylidene chloride, nylon, etc. The end portion 41b can be made of an inelastic material such as polycarbonate, cellulose acetate, polystyrene, etc.

The adhesive tape 38 for sticking the cover 41 to the magazine 13, as indicated by the chain line in FIG. 2, is disposed on all over the flange 13a. Since the adhesion of the cover 41 to the magazine 13 is apt to be weak especially on the front corners of the flange 13a, the adhesive tape 38 is provided on the corners in a manner to be divided and have an additional tape 38' as shown in FIG. 3 for more effective shielding from light.

As shown in FIG. 6, the magazine 13 which is mounted in a magazine frame 39 is loaded in the housing 11. On the part of the magazine frame 39 where the flange 13a of the magazine 13 contacts, a rubber pad 39a is provided (see FIG. 5), so that the magazine 13 is supported by the frame 39 via the pad 39a. The magazine frame 39 is integrated with a base table 40. When a door (not shown) of the housing 11 is open, the base table 40 is able to be drawn out of the housing 11 in the right downward direction in FIG. 6. A magazine change becomes possible by drawing the base table 40 out of the housing 11.

The cover winding section, where the cover 41 for the magazine 13 is wound and unwound, is supported by a U-shaped frame 42 enclosing the magazine 13 and the magazine frame 39 from below. Plates 100 and 101 are fitted on the sides of the frame 42 via pins 87, and the winding roller 17 is rotatably laid between the plates 100 and 101. The plates 100 and 101 are capable of pivoting on the respective pins 87, but the plates 1009 and 101 are urged downward by springs 102 and pressed against the flange 13a of the magazine 13.

Pinions 47 which are fitted on the sides of the support frame 42 via pins 92 are engaged with racks 45a supported by rack holders 45 laid between the base table 40, and thereby the frame 42 and the winding roller 17 are movable along the flange 13a. A transmission system, a winding motor 46, etc. are provided at the right side of the frame 42 in order to move the frame 41 supporting the cover winding section in the directions indicated by the arrows (b) and (b').

Figure 7:
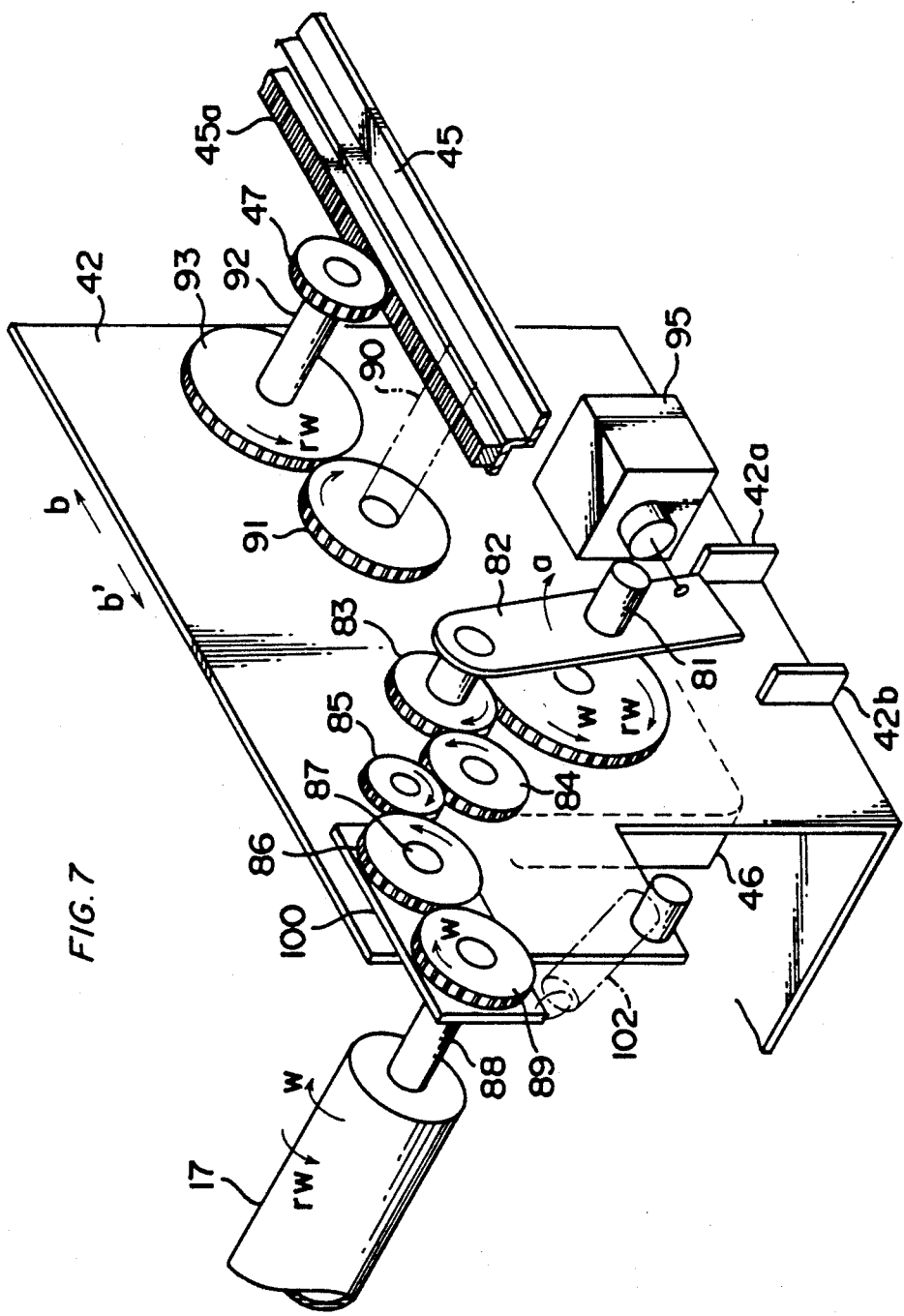
Figure 8:
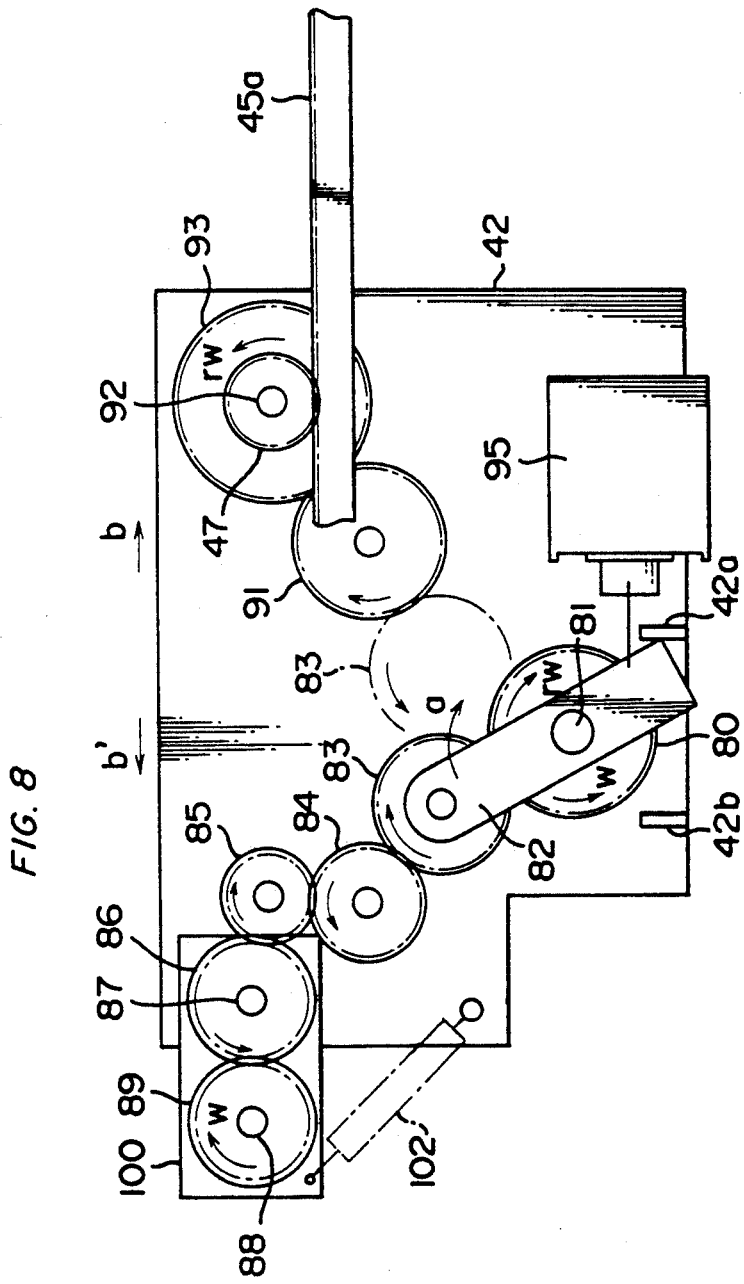
Figure 9:
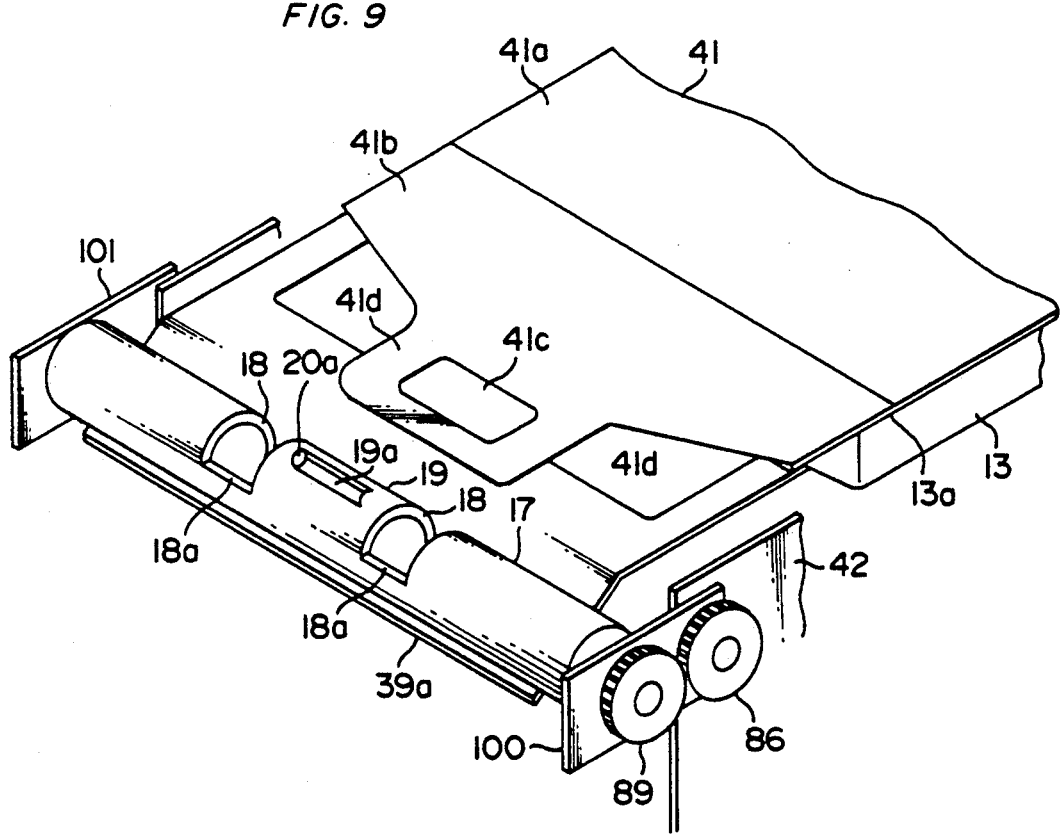

FIGS. 7 and 8 shown the transmission system in detail. The transmission system comprises an output gear 80 of the winding motor 46, a switching gear 83 which is fitted on the end of a switching lever 82 which is coaxial with the output gear 80, idle gears 84, 85 and 86 which are rotatably fitted on the frame 42, a gear 89 fitted on the end of a shaft 88 of the winding roller 17, a gear 93 which is fitted on the pin 92 supporting the pinion 47, an idle gear 91 which is rotatably fitted on the frame 42 and a solenoid 95 connected with the lower edge of the switching lever 82. The solenoid 95 is usually off. Therefore the switching lever 82 which is capable of pivoting on the shaft 81 is urged in the direction of (a) by a spring (not shown), and the switching gear 83 is engaged with the idle gear 91 as indicated by the chain line in FIG. 8. When the solenoid 95 is turned on, the switching lever 82 pivots in the direction reverse to the direction of (a), and the switching gear 83 comes into engagement with the idle gear 84. The oscillation of the switching lever 82 is regulated by projections 42a and 42b on the frame 42.

When winding the cover 41 with the transmission system, first the solenoid 95 is turned on to rotate the motor 46 forward. Thereby, the switching lever 72 is turned in the direction reverse to the direction of (a), the switching gear 83 comes into engagement with the idle gear 84. In this state, the rotating force of the winding motor 46 in the direction of (w) is transmitted from the output gear 80 to the gear 89 via the switching gear 83, the idle gears 84, 85 and 86, and thus the winding roller 17 is rotated in the direction of (w). As the winding roller 17 rotates in the direction of (w), the cover 41, whose end portion 41b is engaged with the winding roller 17 (the structure for which engagement will be described in detail later), is wound around the roller 17, and the support frame 42 moves along the racks 45a in the direction of (b). Thus, the cover 41 is removed from the flange 13a of the magazine 13, and an open part through which the films 20 will be taken out of the magazine 13 is made.

A sensor 50 for detecting a winding start position of the support frame 42 and a sensor 51 for detecting a winding complete position of the frame 42 (the position illustrated in FIG. 6) are disposed on the locus of the frame 42. When the sensor 51 detects the support frame 42, the forward rotation of the winding motor 46 is stopped to stop winding the cover 41.

When unwinding the cover 41, the solenoid 95 is kept off, in which state the switching gear 83 is engaged with the idle gear 91, and the winding motor 46 is reversed. Thereby, the pinion 47 is rotated in the direction of (rw), and the support frame 42 moves in the direction of (b'). The winding roller 17 rotates in the direction of (rw) on the flange 13a following the movement of the support frame 42, and the cover 41 on the winding roller 17 are unwound and stuck on the flange 13a.

In the cover winding operation, the rotating force of the motor 46 is transmitted to the winding roller 17, and the cover 41 is wound around the roller 17 by the rotation of the roller 17. In this state, the cover 41 is supplied with appropriate tension, which assures firm cover winding without causing wrinkles. In the cover unwinding operation, the rotating force of the motor 46 is transmitted to the support frame 42 via the pinions 47, and the winding roller 17 rotates following the movement of the frame 42, which rotation results in cover unwinding. In this state, the cover 41 is supplied with appropriate tension, and the cover 41 is stuck on the flange 13a without wrinkling.

In this embodiment, the switching lever 82 supporting the switching gear 83 is coaxial with the output gear 80 which is upstream of the transmission system, and the direction (the direction reverse to the direction of (a)) in which the switching gear 83 is moved to come into engagement with the idle gear 84 in response to a turning-on of the solenoid 95 is the same as the direction of (w) in which the output gear 80 rotates at that time. Therefore the switching gear 83 rotates around the output gear 80 smoothly by the rotating force of the output gear 80, which assures the engagement of the switching gear 83 with the idle gear 84. The switching gear 83 is pushed against the idle gear 84 by the rotation of the output gear 80 in the direction of (w) when it is engaged with the idle gear 84, and is pushed against the idle gear 91 by the rotation of the output gear 80 in the direction of (rw) when it is engaged with the idle gear 91. Thus, the switching gear 83 is certainly engaged with either the idle gear 84 or the idle gear 91, and there is no fear of skipping a tooth. Further, since the projections 42a and 42b act as stoppers of the oscillation of the switching lever 82, the backlashes of the idle gears 84 and 91 against the switching gear 83 are kept appropriately.

Since the main part 41a of the cover 41 is made of an elastic material, the adhesion of the cover 41 to the flange 13a is strong. Also, since the end portion 41b of the cover 41 is made of a less elastic material than the main part 41a, there is no fear that the end portion 41b may stretch because of the great force applied to the end portion 41b at the time of starting cover winding. Consequently, when the cover 41 is unwound, the end portion 41b is stuck on the front end 13a' of the flange 13a (see FIG. 6) without a gap. On the front end 13a' of the flange 13a, the cover 41 is not supplied with tension in the directions indicated by the arrows (c) and (c'), and the cover 41 is apt to form wrinkles extending in the directions (c) and (c'). However, in this embodiment, since the end portion 41b of the cover 41 is made of a less elastic material, such wrinkles are not formed.

Further, a dial 44 is disposed on the edge of the pin 90 fixed on the frame 42 so that the cover winding section can be moved manually.

Referring to FIGS. 9 through 12, a structure which assures a firm engagement of the end portion 41b of the cover 41 with the winding roller 17 is hereinafter described.

Figure 10:
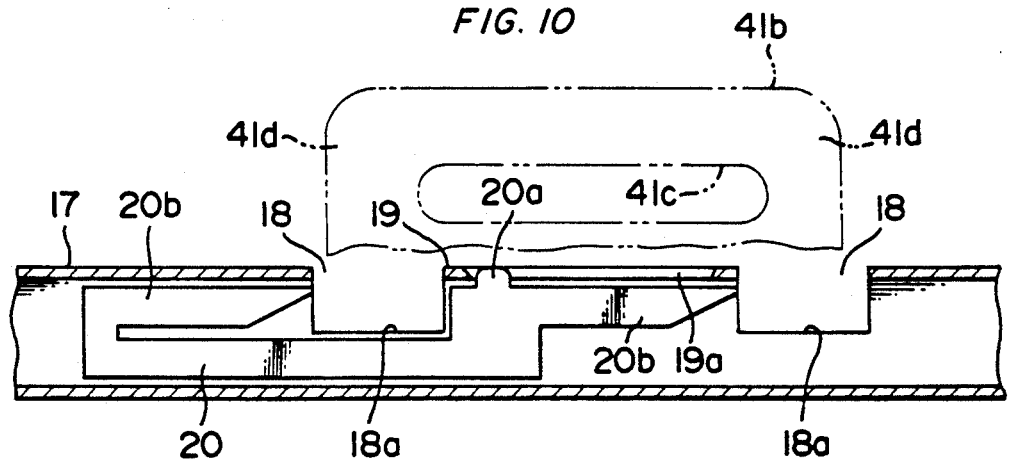
Figure 11:
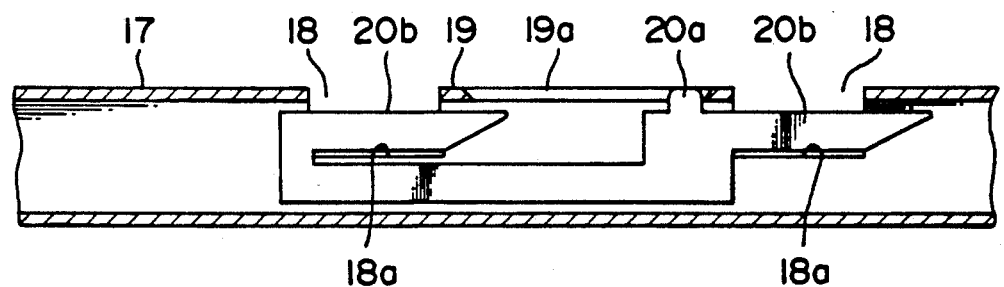

The winding roller 17 is cylindrical and has notches 18. The area between the notches 18 is an engaging portion 19, where a slit 19a is formed. Inside the roller 17, a shaft 20 is provided in a manner to slide along its axis. The shaft 20 has a slide pin 20a engaging with the slit 19a and protrusions 20b, and the shaft 20 is moved within the range regulated by the slit 19a by controlling the slide pin 20a. When the shaft 20 is set in the left side as shown in FIG. 10, the protrusions 20b retreat from the notches 18, and the notches 18 are open. When the shaft 20 is set in the right side as shown in FIG. 11, the protrusions 20b close the notches 18.

An opening 41c is formed on the end portion 41b of the cover 41. The magazine frame 39 protrudes a declining plate 39a from the front edge which is on the same level as the flange 13a.

With this structure, when engaging the cover end portion 41b with the winding roller 17, first the slide pin 20a is controlled so that the shaft 20 is set in the left side as shown in FIG. 10 and that the notches 18 are open. Next, the opening 41c of the cover end portion 41b is engaged with the engaging portion 19 of the winding roller 17, and then the shaft 20 is moved back to the right (see FIG. 11). In this state, the sides 41d of the opening 41c are nipped between the bottom 18a of the respective notches 18 and the respective protrusions 20b, and thus the cover end portion 41b is engaged with the winding roller 17 firmly.

Figure 12:
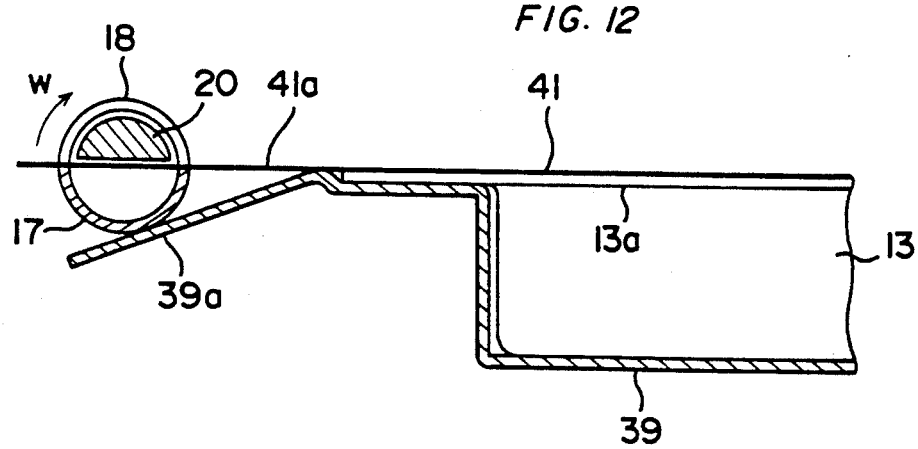

The above-described engaging operation is performed in a state as shown in FIG. 12 that the winding roller 17 is on the edge of the declining plate 39a with the notches 18 facing up. At that time, the cover end portion 41b is tense and stretched on the same level as the flange 13 to the roller 17. A cover winding operation is started by driving the winding roller 17 to rotate in the direction of (w), and the cover end portion 41b starts to be wound around the roller 17. A cover unwinding operation is completed when the winding roller 17 returns to the position indicated in FIG. 12 where the cover end portion 41b is tense. In this state, the notches 18 and the slide pin 20a of the shaft 20 face up, and the cover end portion 41b can be disengaged from the winding roller 17 easily.

Figure 13:
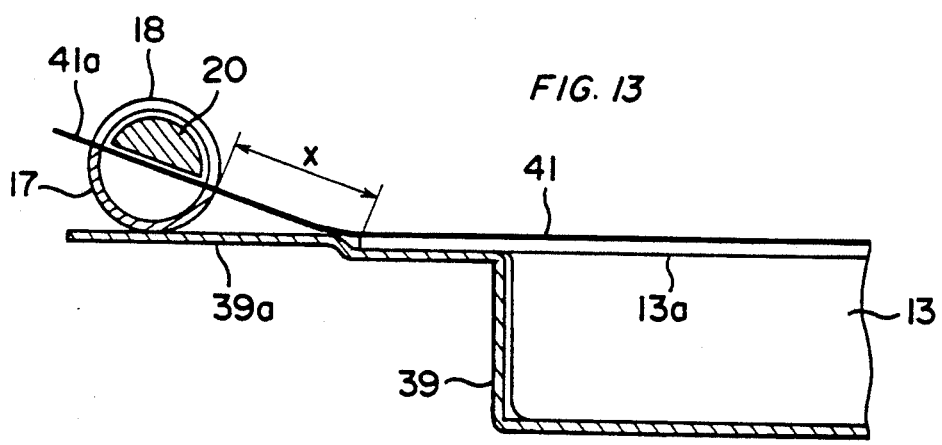
Figure 14:
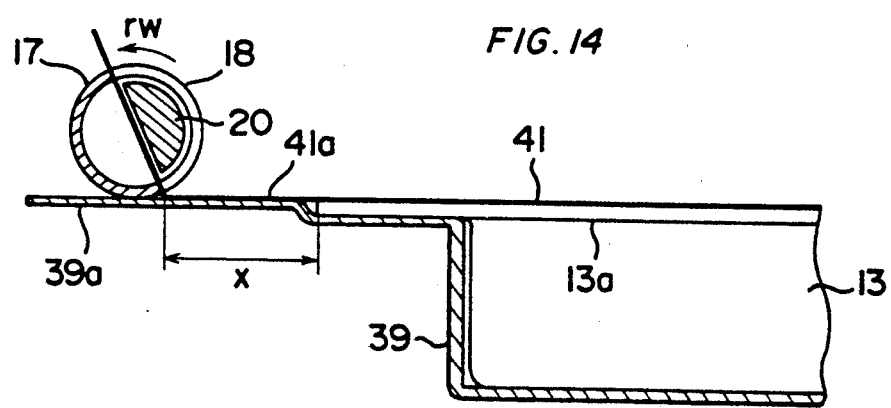

FIGS. 13 and 14 show a case that the plate 39a is extended from the magazine frame 39 on the same level as the flange 13a. In this case, when the cover end portion 41b comes into engagement with the winding roller 17, the part X of the end portion 41b inclines from the front edge of the flange 13a. Therefore the winding roller 17 will slip until the part X becomes flat. That is, the cover 41 starts to be wound when the part X becomes flat as shown in FIG. 14. A cover unwinding operation is completed in the condition shown in FIG. 14 because the winding roller 17 is not directly driven but rotates following the movement of the support frame 42. In order to disengage the cover end portion 41b from the winding roller 17, the winding roller 17 must be further rotated in the direction of (rw) until the slide pin 20a and the notches 18 face up as shown in FIG. 13, which is troublesome. In this embodiment, however, since the plate 39a is extended downward, when completing a cover unwinding operation, the winding roller 17 automatically stops rotating in a state that the slide pin 20a and the notches 18 face up, and the successive operation is performed easily.

Figure 15:
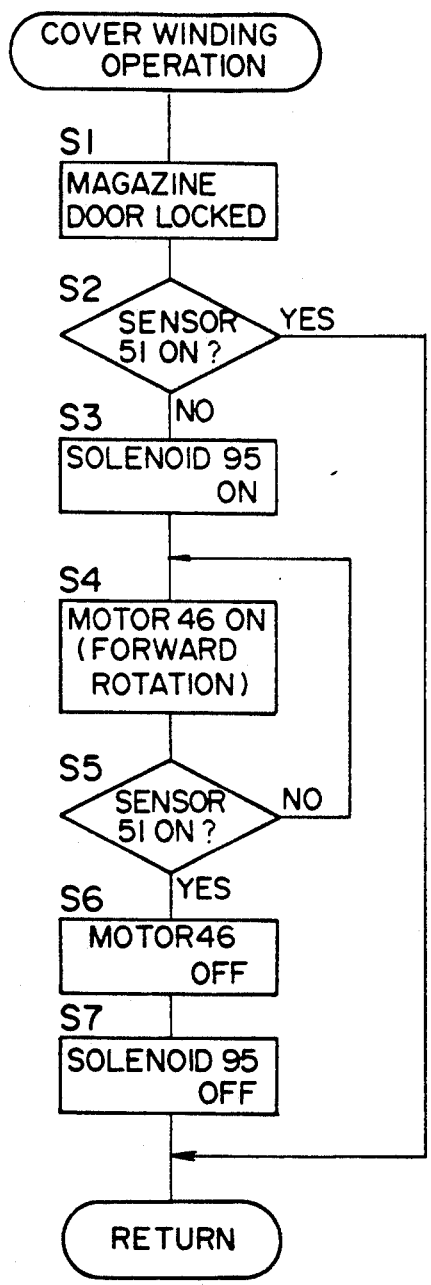
Figure 16:
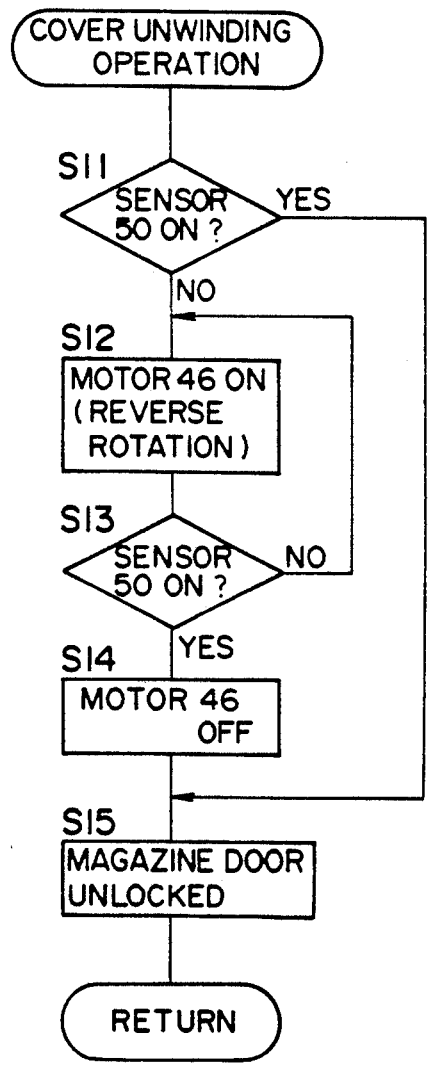

FIGS. 15 and 16 show a procedure of winding the cover 41 and a procedure of unwinding the cover 41 respectively.

First, the cover winding procedure is described referring to FIG. 15. The routine shown in FIG. 15 is performed immediately after the magazine 13 is loaded in the printer 10.

At step S1, the door (not shown) of the printer 10 through which the magazine 13 was loaded is locked. It is checked at step S2 whether the sensor 51 is on or off to judge whether the cover winding section is in the winding complete position. When the sensor 51 is on, the completion of the cover winding is judges, and the operation is completed. When the sensor 51 is off, at step S3 the solenoid 95 is turned on in order to engage the switching gear 83 with the idle gear 84. At step S4, the winding motor 46 is rotated forward in order to rotate the winding roller 17 in the winding direction (in the direction of (w)). Thereby, the cover 41 is wound around the roller 17, and the support frame 42 moves in the direction of (b). This movement of the cover winding section is continued until the sensor 51 is turned on. Specifically, when the cover winding section reaches the winding complete position as shown in FIG. 6, the sensor 51 is turned on ("YES" at step S5), and the winding motor 46 is turned off at step S6. Then, the solenoid 95 is turned off at step S7. Thus the support frame 42 stops at the winding complete position.

Now referring to FIG. 16, the cover unwinding procedure is described. This routine is performed when a magazine unload switch on an operation panel (not shown) of the printer 10 is depressed and when the emptiness of the magazine 13 is detected.

First, the sensor 50 disposed at the winding start position of the support frame 42 is checked at step S11 in order to judge whether the cover 41 has been unwound completely. When it is judged at step S11 that the cover 41 has been unwound completely, the door for magazine loading is unlocked immediately at step S15. When the cover 41 has not been unwound completely ("NO" at step S11), the winding motor 46 is rotated in reverse at step S12. At that time, the solenoid 95 is kept off, and the switching gear 83 is engaged with the idle gear 91. Therefore the rotating force of the motor 46 is transmitted to the pinion 47, and the pinion 47 rotates in the direction of (rw). Thereby, the support frame 42 moves in the direction of (b'), the winding roller 17 rotates in the direction of (rw), and the cover 41 is unwound from the roller 17. The unwound cover 41 is stuck on the flange 13a evenly with the adhesive tape 38. When it is judges from a turning-on of the sensor 50 that the support frame 42 reaches the winding start position ("YES" at step S13), the motor 46 is turned off at step S14, and the door for the magazine loading is unlocked at step S15. Then, the magazine 13 can be unloaded by drawing the base table 40.

Figure 17:
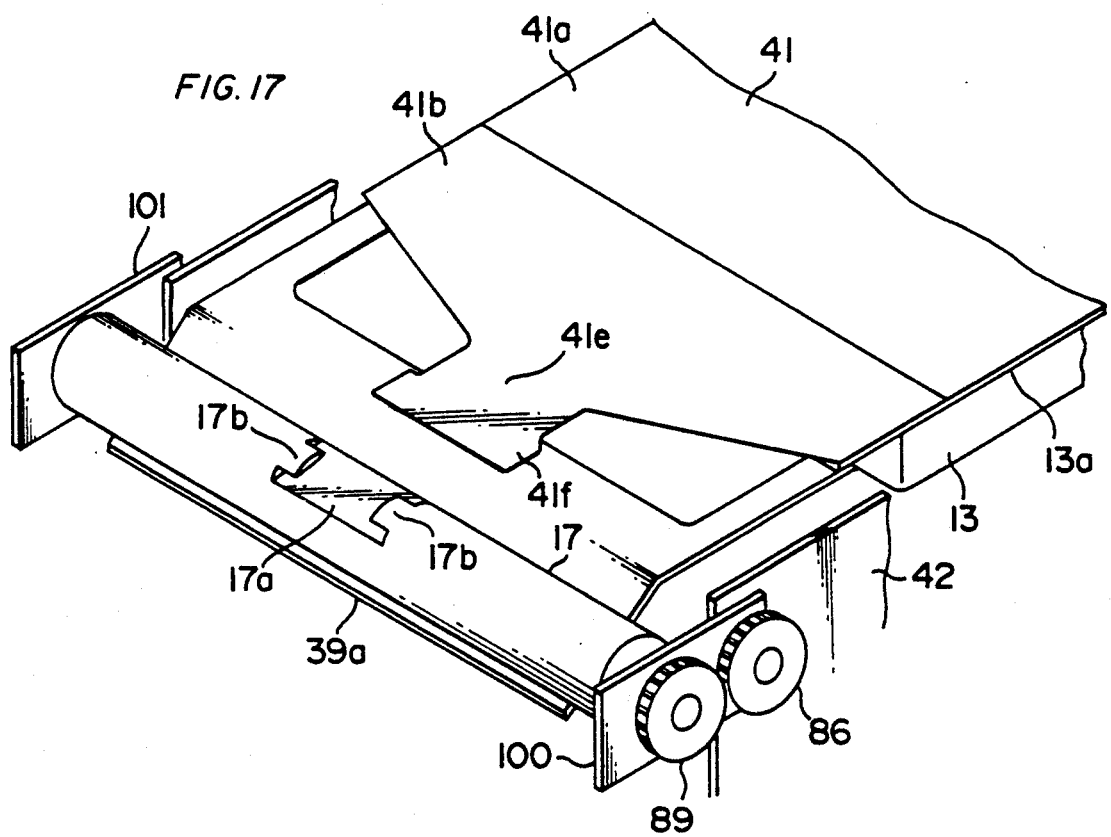
FIG. 17 is a perspective view of a cover winding section, the view showing a structure for the engagement of the end portion of the cover with the winding roller according to a second embodiment.
Figure 18:
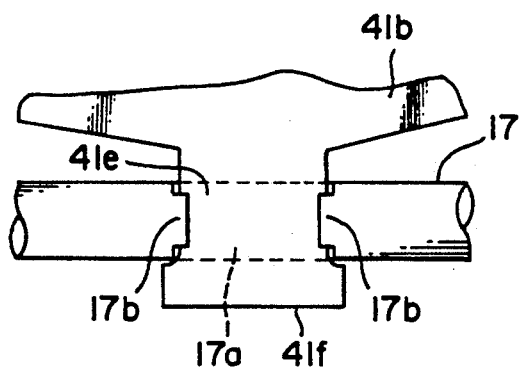
FIG. 18 is a plan view of the engaged cover end portion and the winding roller in the structure shown in FIG. 17.

FIGS. 17 and 18 show a second exemplary structure for the engagement of the cover end portion 41b and the winding roller 17, in which the cover end portion 41b has a neck 41e which is narrow and a head 41f which is wider than the neck 41e. On the winding roller 17, a notch 17a is formed in a manner that the roller 17 has protrusions 17b extending from the sides of the notch 17a. The width of the notch 17a is larger than that of the neck 41e and smaller than that of the head 41f. The gap between the protrusions 17b is smaller than the width of the neck 41e. In order to engage the cover end portion 41b with the winding roller 17, as shown in FIG. 18, the neck 41e and the head 41f should be engaged with the notch 17a and the protrusions 17b and that the head 41f is protruded from the notch 17a.

Figure 19:
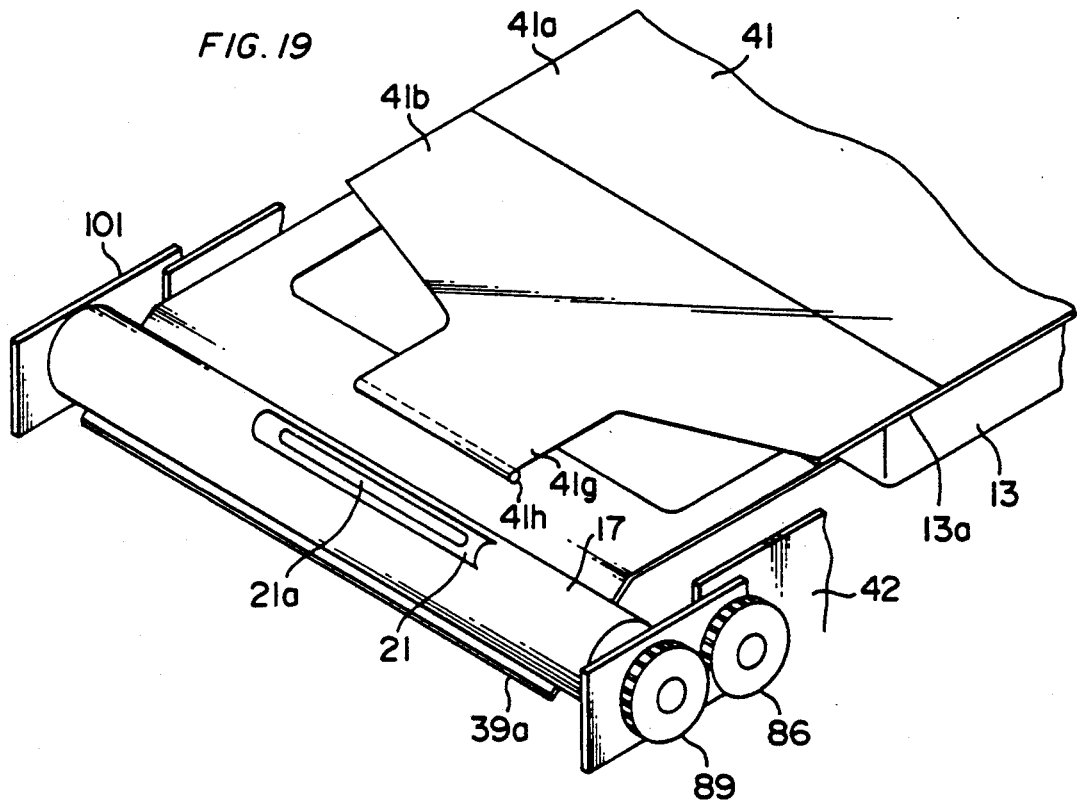
FIG. 19 is a perspective view of a cover winding section, the view showing a structure for the engagement of the end portion of the cover and the winding roller according to a third embodiment.
Figure 20:
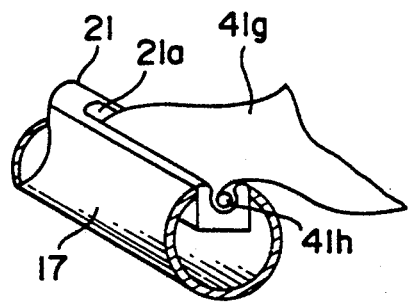
FIG. 20 is a perspective view of the engaged cover end portion and the winding roller in the structure shown in FIG. 19.

FIGS. 19 and 20 show a third exemplary structure for the engagement of the cover end portion 41b and the winding roller 17, in which the cover end portion 41b has a tab 41g provided with a pin 41h at the end. A holder 21 on which a groove 21a is formed is put inside the winding roller 17, and the pin 41h is to be engaged with the groove 21a. The pin 41h is engaged with and disengaged with the groove 21a by pushing and pulling the tab 41g toward and from the axis of the holder 21. While the cover 41 is being wound or being unwound, the pin 41h is never disengaged from the groove 21a because the tension of the cover 41 acts upon the pin 41h as force in the direction of a tangent of the circumference of the roller 17.

Figure 21:
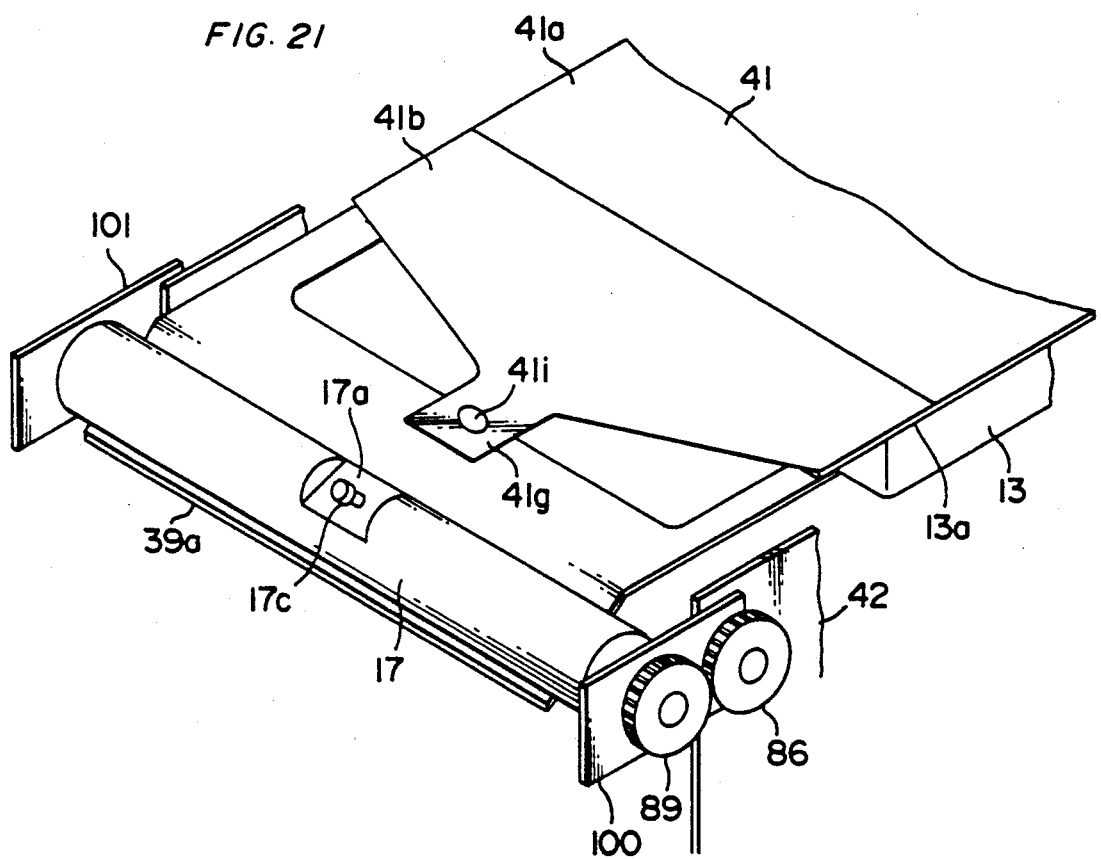
FIG. 21 is a perspective view of a cover winding section, the view showing a structure for the engagement of the end portion of the cover and the winding roller according to a fourth embodiment.

FIG. 21 shows a fourth exemplary structure for the engagement of the cover end portion 41b with the winding roller 17, in which the cover end portion 41b has a tab 41g on which a hole 41i is formed. A notch 17a is formed on the winding roller 17, and a hook 17c is provided in the notch 17a. The notch 17a is a little wider than the tab 41g, and the tip of the hook 17c is under the level of the circumference of the roller 17. The hole 41i is engaged with the hook 17a, and while the cover 41 is wound or unwound, the engagement is never broken because of the tension of the cover 41.

Figure 22:
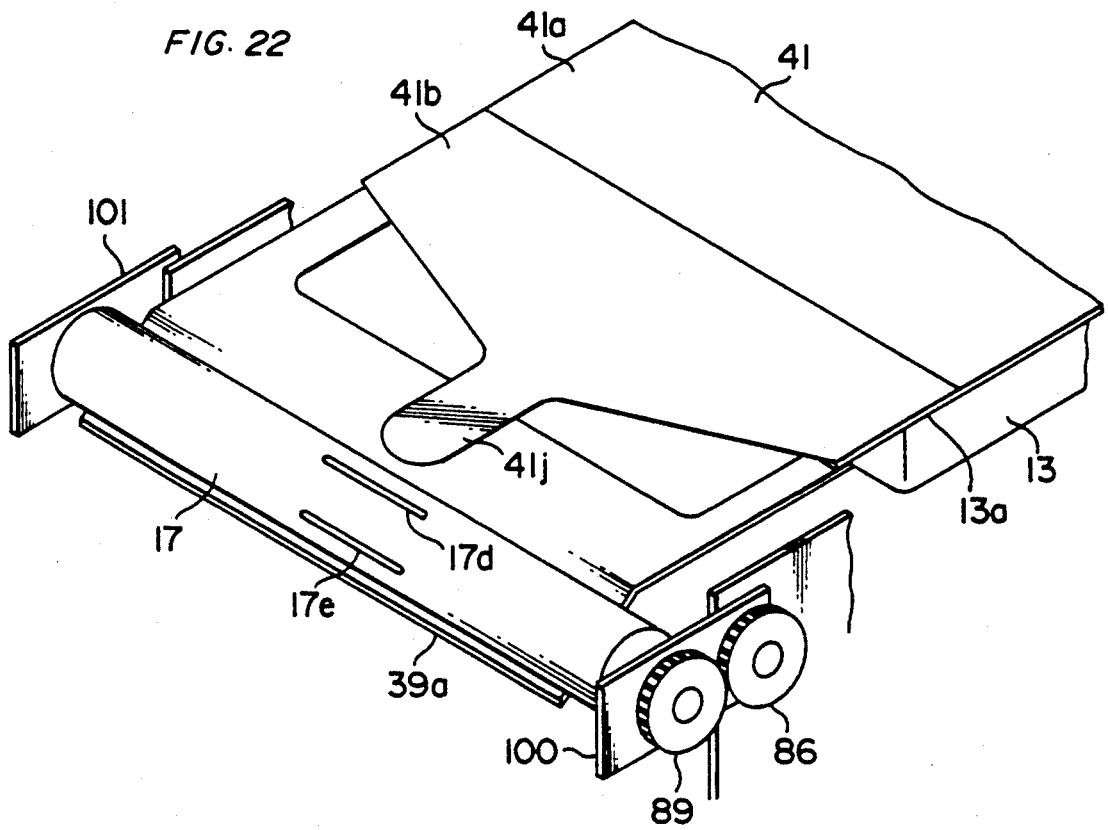
FIG. 22 is a perspective view of a cover winding section, the view showing a structure for the engagement of the end portion of the cover and the winding roller according to a fifth embodiment.
Figure 23:
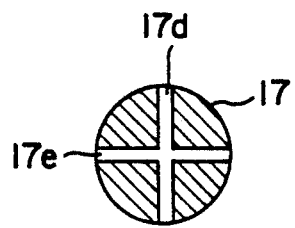
FIG. 23 is a cross sectional view of the winding roller according to the fifth embodiment.

FIGS. 22 and 23 show a fifth exemplary structure for the engagement of the cover end portion 41b and the winding roller 17, in which the cover end portion 41b has a tab 41j. Slits 17d and 17e are made in the winding roller 17 in a manner that the slits 17d and 17e cross each other inside the roller 17 as shown in FIG. 23. The tab 41j is inserted into either the slit 17d or the slit 17e, and while the cover 41 is wound or unwound, the tab 41j is stuck to the slit 17d or 17e because of the tension of the cover 41 in the direction of a tangent of the circumference of the roller 17, and the engagement is never broken.

Although the present invention has been described in connection with the embodiments above, it is to be noted that various changes and modifications are apparent to those who are skilled in the art. Such changes and modifications are to be understood as included within the scope of the present invention defined by the appended claims, unless being separated therefrom.

The transmission system for the cover winding section may be made in various forms, and for instance, it is possible to change the arrangement of the gears so that the winding motor 46 can be rotated forward for both cover winding and cover unwinding. Energizing timing of the solenoid 95 can be arranged in reverse, that is, the solenoid 95 may be so made that the solenoid 95 is turned on for cover unwinding not for cover winding. In this case, the switching gear 83 is engaged with the idle gear 84 when the solenoid 95 is turned off.

What is claimed is:

1. A magazine for photosensitive sheets, comprising:
a casing in which photosensitive sheets are stored, the casing having an opening through which the photosensitive sheets are taken out; and
a light screening cover member which is stuck along its entire perimeter on the casing to cover the opening, the cover member having a special portion which extends beyond the adhered perimeter and is used for removing the cover member from the casing, the special portion has less elasticity than the remaining part of the cover member, across the casing.

2. A magazine for photosensitive sheets as claimed in claim 1, wherein the cover member is capable of adhering to and separating from the casing repeatedly.

3. A magazine for photosensitive sheets as claimed in claim 1, wherein the special portion of the cover member is stuck along its entire perimeter to the other part of the cover member with an adhesive tape.

4. A magazine for photosensitive sheets as claimed in claim 1, wherein the special portion of the cover member has an engaging part to be engaged with means for removing the cover member from the casing.

5. A magazine for photosensitive sheets, comprising:
a box-type casing having an opening; and
a light screening cover member which is stuck on the casing to cover the opening, the cover member having an end portion protruding from the casing, said end portion has less elasticity than the other part of the cover member.

6. A magazine for photosensitive sheets as claimed in claim 5, wherein the cover member is capable of adhering to and separating from the casing repeatedly.

7. A magazine for photosensitive sheets as claimed in claim 5, wherein the end portion of the cover member is stuck to the other part of the cover member with an adhesive tape.

8. A magazine for photosensitive sheets as claimed in claim 5, wherein the end portion of the cover member has an engaging part to be engaged with means for removing the cover member from the casing.

9. A magazine for storing and dispensing photosensitive sheets, comprising:
a housing member having an upper opening and a hollow interior for storing photosensitive sheets, and
an opaque flexible cover member having a main portion of a size slightly larger than the upper opening and adhered around the upper opening and an end portion extending beyond the housing member and having a configuration to be engageable with a winding roller to enable an opening and subsequent closing of the flexible cover member, the end portion being significantly less flexible than the main portion.

10. The magazine of claim 9 wherein the end portion is adhered in an overlapping manner to the main portion.

11. The magazine of claim 9 wherein the housing member has a peripheral flange which contacts the flexible cover member on an upper surface and resilient means for providing flexibility are mounted on a lower surface of the flange.

12. A magazine for storing and dispensing photosensitive sheets, comprising:
a housing member having an upper opening and a hollow interior for storing photosensitive sheets, and
an opaque flexible cover member having a main portion adhered around the upper opening and an end portion extending beyond the housing member, the end portion being significantly less flexible than the main portion and having an aperture configured to be engageable with a winding roller.

13. The magazine of claim 12 wherein the main portion has a tensile elastic coefficient of about 40 kg/cm$^2$ and the end portion has a tensile elastic coefficient of about 400 kg/cm$^2$.

14. The invention of claim 12 wherein the housing member includes a flange and resilient means are mounted on an underside of the flange relative to the cover member.

15. The magazine of claim 12 wherein the housing member has a peripheral flange which contacts the flexible cover member on an upper surface and resilient means for providing flexibility are mounted on a lower surface of the flange.

* * * * *